(12) United States Patent
Volmering et al.

(10) Patent No.: US 12,172,130 B2
(45) Date of Patent: Dec. 24, 2024

(54) MEMBRANE FILTER

(71) Applicant: MEMBION GMBH, Roetgen (DE)

(72) Inventors: Dirk Volmering, Aachen (DE); Klaus Vossenkaul, Aachen (DE)

(73) Assignee: MEMBION GMBH, Roetgen (DE)

( * ) Notice: Subject to any disclaimer, the term of this patent is extended or adjusted under 35 U.S.C. 154(b) by 496 days.

(21) Appl. No.: 17/530,902

(22) Filed: Nov. 19, 2021

(65) Prior Publication Data

US 2022/0088540 A1 Mar. 24, 2022

Related U.S. Application Data

(63) Continuation of application No. PCT/EP2020/065343, filed on Jun. 3, 2020.

(30) Foreign Application Priority Data

Jun. 6, 2019 (DE) .......................... 102019115265.8

(51) Int. Cl.
| | |
|---|---|
| *B01D 63/04* | (2006.01) |
| *B01D 63/02* | (2006.01) |
| *B01D 65/08* | (2006.01) |

(52) U.S. Cl.
CPC ......... *B01D 63/043* (2013.01); *B01D 63/024* (2013.01); *B01D 65/08* (2013.01);
(Continued)

(58) Field of Classification Search
CPC .... B01D 63/043; B01D 63/024; B01D 65/08; B01D 2313/042; B01D 2313/06; B01D 2313/10; B01D 2313/125; B01D 2313/13; B01D 2313/203; B01D 2313/26; B01D 2313/501; B01D 2315/06; B01D 2319/04; B01D 2321/185; B01D 2313/025; B01D 2313/12; B01D 2313/21; B01D 2313/50; B01D 61/18; Y02W 10/10; C02F 3/1273

See application file for complete search history.

(56) References Cited

U.S. PATENT DOCUMENTS

2017/0087518 A1* 3/2017 Volmering ............. B01D 61/18

FOREIGN PATENT DOCUMENTS

| DE | 19611945 A1 | 9/1999 |
|---|---|---|
| DE | 102013218188 B3 | 12/2014 |

(Continued)

*Primary Examiner* — Waqaas Ali
(74) *Attorney, Agent, or Firm* — Von Rohrscheidt Patents

(57) ABSTRACT

A membrane filter configured to filter a liquid, the membrane filter including a base element including at least one membrane carrier that is externally flowable by the liquid and a gas; hollow fiber membranes respectively including lumen and attached at a top of the at least one membrane carrier wherein a liquid permeate is filterable from the liquid into the lumen; a one piece extruded circumferentially closed pipe that envelops the hollow fiber membranes; a gas inlet configured to let gas into a bottom of the membrane filter; at least one permeate collection cavity included in the base element and connected with the lumen and configured to collect the liquid permeate from the hollow fiber membranes; a permeate outlet included in the base element and configured to drain the liquid permeate from the at least one permeate collection cavity laterally from the base element.

10 Claims, 10 Drawing Sheets

(52) U.S. Cl.
CPC .... *B01D 2313/042* (2022.08); *B01D 2313/06* (2013.01); *B01D 2313/10* (2013.01); *B01D 2313/125* (2013.01); *B01D 2313/13* (2013.01); *B01D 2313/203* (2022.08); *B01D 2313/26* (2013.01); *B01D 2313/501* (2022.08); *B01D 2315/06* (2013.01); *B01D 2319/04* (2013.01); *B01D 2321/185* (2013.01)

(56) References Cited

FOREIGN PATENT DOCUMENTS

| | | |
|---|---|---|
| WO | WO 0222244 A1 | 3/2002 |
| WO | WO2015036459 A1 | 3/2015 |
| WO | WO2016180628 A1 | 11/2016 |

\* cited by examiner

MEMBRANE FILTER

RELATED APPLICATIONS

This application claim is a continuation of International patent application PCT/EP2020065343 filed on Jun. 3, 2020 claiming priority from German Patent application DE 10 2019 115 265.8 filed on Jun. 6, 2019 both of which are incorporated in their entirely by this reference.

FIELD OF THE INVENTION

The invention relates to a membrane filter configured to filter a liquid.

BACKGROUND OF THE INVENTION

A membrane filter with the described features is known from WO 2015 036 459 A1 filed by the inventors of the instant application.

The known membrane filter is configured for filtering waste water that includes large amounts of solids that can be found e.g.; in biological waste water treatment plants in membrane bioreactors (MBR).

In an embodiment of the known membrane filter hollow fiber membranes of the membrane filter that is configured to operate submerged are attached in exactly one membrane carrier of a base element wherein the membrane carrier is passable by a flow of the liquid. The base element includes a permeate collection cavity configured to collect the permeate from the hollow fiber membranes, wherein the hollow fiber membranes are connected to the permeate collection cavity by the lumens. The hollow fiber membranes are individually closed on top. The base element furthermore includes a permeate outlet for letting the permeate out from the permeate collection cavity laterally from the base element. Furthermore, the membrane filter includes a gas inlet for letting the gas into the membrane filter wherein the gas inlet is arranged at the bottom of the membrane filter.

It is characteristic for the membrane filter that the hollow fiber membranes are enveloped by a circumferentially closed pipe which directly adjoins the base element from above. WO 2015/036459 A1 does not disclose exactly how the pipe and the base element are connected with one another. However, from a maintenance point of view it is advantageous to make the connection of pipe and base element disengageable without destroying the membrane filter.

It is evident from the drawing figures of WO 2015/036459 that the pipe as well as the base element include a connection element at the connection location wherein the connection element is oriented from a circumferentially outward. A connection clamp can be applied to the circumference from an outside wherein the connection clamp provides a form locking connection of base element and pipe. Pipe connections of this type are also being used in other fields. Alternatively, the pipe and the base element can include flanges that are threaded together.

The connection methods of pipe and base element have in common that they require space in an outward direction about the circumference of the pipe. Since many pipes are mounted parallel adjacent to each other in a frame, in a large installation of the membrane filters, reducing a size of externally applied connection clamps or connection flanges reduces the packaging density of the entire membrane filter, this means the pipes have to be offset further from each other which reduces a number of membrane pipes that can be installed in a frame of a predetermined size.

Additionally, sludge that flows up in an interior of the pipes in a portion of the membranes due to air introduced therein has to flow down again during continuous operations. This occurs in an outer portion of the pipes where no air is introduced. This means in a large module in an outer space between the individual pipes. Herein the edges and bolts of connection clamps or flanges form obstacles where hair and fibrous compounds accumulate easily.

In addition to the installation space requirement for the described connections of pipe and base element there is another problem in the known membrane filter. The connection location of the pipe and the base element is in the portion of the membranes, this means above the membrane carrier. Since the transitions of the described connection elements at the inside typically include edges or a slight offset as a matter of configuration, this means they are not smooth, hair and fibrous compounds can accumulate easily at this location which leads to a blocking of the membrane filter or the membranes can rub against the edges.

As an alternative to the disengageable connections the pipe can also be glued onto the base element from above. This, however, limits the ease of maintenance of the membrane filter. Additionally, there is the same problem also here of edges or glue exits at the joint that lead to an accretion of hair and fibrous compounds or rubbing of the membranes at these locations.

In the back ground of the invention also DE 198 11 945 A1 describes a membrane filter that includes a base element with a membrane carrier in which hollow fiber membranes are attached. One of the inventors of this application is an inventor in the instant application. Herein the hollow fiber membranes and the base element are enveloped by a common pipe, wherein the permeate generated is let out from the pipe in downward direction through a permeate outlet. This has the disadvantage that gas forming on the permeate side during filtration and which gases out when the liquid to be filtered passes through the membranes and which is transported downward in the lumen of the hollow fiber membranes with the liquid typically collects in the permeate collection cavity and remains therein. During the next back flushing of the membranes the gas is then initially flushed back into the membranes and not the liquid as intended. This impairs an effectiveness of the back flushing and thus of the entire filtration.

BRIEF SUMMARY OF THE INVENTION

Thus, it is an object of the invention to prevent edges where hair or fibers can accumulate or where the membranes can chafe. Improving upon the known membrane filter the object is achieved by a membrane filter configured to filter a liquid, the membrane filter including a base element including at least one membrane carrier that is externally flowable by the liquid and a gas; hollow fiber membranes respectively including lumen and attached at a top of the at least one membrane carrier wherein a liquid permeate is filterable from the liquid into the lumen; a one piece extruded circumferentially closed pipe that envelops the hollow fiber membranes; a gas inlet configured to let gas into a bottom of the membrane filter; at least one permeate collection cavity included in the base element and connected with the lumen and configured to collect the liquid permeate from the hollow fiber membranes; a permeate outlet included in the base element and configured to drain the liquid permeate from the at least one permeate collection cavity laterally from the base element, wherein a bottom edge of the pipe is arranged below the permeate outlet and the permeate outlet runs laterally through an opening in a wall of the pipe, wherein an annular gap between the at least one membrane carrier and the pipe is configured as an open flow cross section for a flow of the liquid and the gas, and wherein the base element and the pipe are connected with each other. Laterally means that the permeate outlet runs essentially transversal to the vertically oriented hollow fiber membranes. Thus includes a horizontal as well as a downward slanted or upward slanted path of the permeate outlet.

This assures that there are no edges or transitions in the portion of the membranes where hair or fibrous compounds can accumulate or where the membranes can chafe.

Simultaneously, the lateral permeate outlet provides that gases that gas out during filtration do not accumulate in the permeate collection cavity but are run out of the membrane filter directly.

Additionally, connection elements on the outside of the pipe that require a large amount of installation space are avoided. Thus, the pipes in a large membrane filter can be mounted closer together which has a positive impact by increasing the packaging density of the membrane filter according to the invention.

Due to its insensitivity relative to hair and fibrous compounds in the liquid to be filtered the membrane filter according to the invention is particularly suited for filtering waste water that is rich in solids and that includes a high amount of hair and fibrous compounds as they can be found e.g. in biological waste water plants in membrane bioreactors (MBR). Thus, the membrane filter can either be submerged in the basins of the waste water plant or can be provided with feed pipes and exhaust pipes and set up dry. The driving force for the filtration is typically provided in the submerged embodiment through a vacuum at the permeate side, whereas the dry variant operates with a positive pressure on a side of the liquid to be filtered.

It is characteristic for the membrane filter according to the invention that the hollow fiber membranes are enveloped by a one piece circumferentially closed extruded pipe. Provided in one piece means that the pipes are integrally provided in one piece.

The hollow fiber membranes have a diameter of less than 5 mm, typically 0.5 to 3 mm and have a permeability of micro filtration membranes or ultra-filtration membranes. Using hollow fiber membranes for reverse osmosis or nano filtration is also possible. Fixing the hollow fiber membranes is advantageously performed only at their bottom side in a base element. Alternatively, the fixing can also be performed additionally in a top element.

In order to prevent a blocking of the membrane filter by filtered substances the membrane filter is flushed continuously or in periodic intervals. Typically used methods for physically flushing the membrane filters operate with a permeate side back flushing of the hollow fiber membranes with liquid or gas combined with a gas bubble flushing on an outside of the hollow fiber membranes. During gas bubble flushing, gas bubbles are introduced from below into membrane filter wherein the gas bubbles rise along the hollow fiber membranes and move the hollow fiber membranes in the liquid to be filtered. The rising gas bubbles always generate an upward flow of the liquid. The shear force of the two-phase flow including gas and liquid has a high level of turbulence which disengages accretions from the membranes and flushes them out. In membrane bio reactors air is typically used as a gas.

The so-called mammoth pumping effect, this means upward flow of the liquid through the membrane filter induced by the rising gas bubbles has a particularly strong cleaning effect upon the hollow fiber membranes since the hollow fiber membranes are enveloped by a circumferentially closed pipe since the gas bubbles are thus retained in the membrane filter, this means directly adjacent to the hollow fiber membranes. The positive effect of the pipe is described in the background of the invention among others in JP-2003-024 937 and US-2006/0273007 A1.

In smaller embodiments of the membrane filter, this means up to a diameter of the base element of approximately 10 cm, the permeate outlet can be threaded tight from the outside through the pipe into the base element and thus connected with the base element.

In an advantageous embodiment of the membrane filter, the opening of the pipe extends to a bottom edge of the pipe. Thus, the pipe can be pushed with the opening over the base element and over the permeate outlet leading laterally out of the base element.

Thus, the membrane filter according to the invention can include a membrane carrier that is circular in a horizontal sectional view and thus also a circular pipe. Alternatively, the membrane carrier and the pipe include a rectangular, polygonal cross section or any other cross section.

For increasing dimensions of the base element and the pipe cross section it is advantageous that the base element includes plural membrane carriers that are equipped with membranes so that the liquid can flow around the membrane carriers. This prevents an excessively large contiguous cross-sectional surface of the membrane carrier that is equipped with membranes, which could lead to sludge contamination of the hollow fiber membranes.

In order to utilize the installation height of the membrane filter in an optimum manner it is advantageous that the gas outlet runs laterally through the opening of the pipe. Therefore the gas inlet does not increase the installation height of the membrane filter any further.

For reasons of static stability, it is helpful in particular for larger cross sections of the base element to attach the base element at two opposites in the pipe. For this purpose, the gas inlet can be run e.g. from a second opposite opening in the wall of the pipe. In this case the lateral permeate outlet and the lateral air inlet form two opposite anchors which fix and retain the base element in the pipe.

In an advantageous embodiment of the membrane filter the base element and the pipe are connected with each other by connection elements. In this case the connection can be provided by form locking, e.g. by simple interlockable blind plugs or alternatively by friction blocking, e.g. by a threaded connection. Connection elements of this type provide a simple and cost-effective fixing of the base element in the pipe.

The attachment of the connection elements at the base element can be provided e.g. through walls formed at the base element which also additionally stiffen and stabilize the base element in the portion of the connection with the pipe. In an advantageous embodiment of the membrane filter according to the invention the connection elements respectively permeate the pipe and at least one wall of the base element.

Additionally, the connection elements can be configured so that the pipe and the base element are manually removeable after removing the connection elements. This is particularly advantageous for maintaining the membrane filter. This has the additional advantage that the old pipe can be plugged onto a base element with new hollow fiber membranes so that the pipe is re-useable after a replacement of the membrane filters after the useful life of the hollow fiber membranes has expired.

Should it become apparent after several years of operating the filter that manual disengagement of the pipe from the base element is not required for maintenance reasons the pipe and the base element can be glued together when the pipe is slid on which is a cost effective alternative.

BRIEF DESCRIPTION OF THE DRAWINGS

The invention is subsequently described based on embodiments with reference to drawing figures, wherein.

DETAILED DESCRIPTION OF THE INVENTION

Figure 1A:
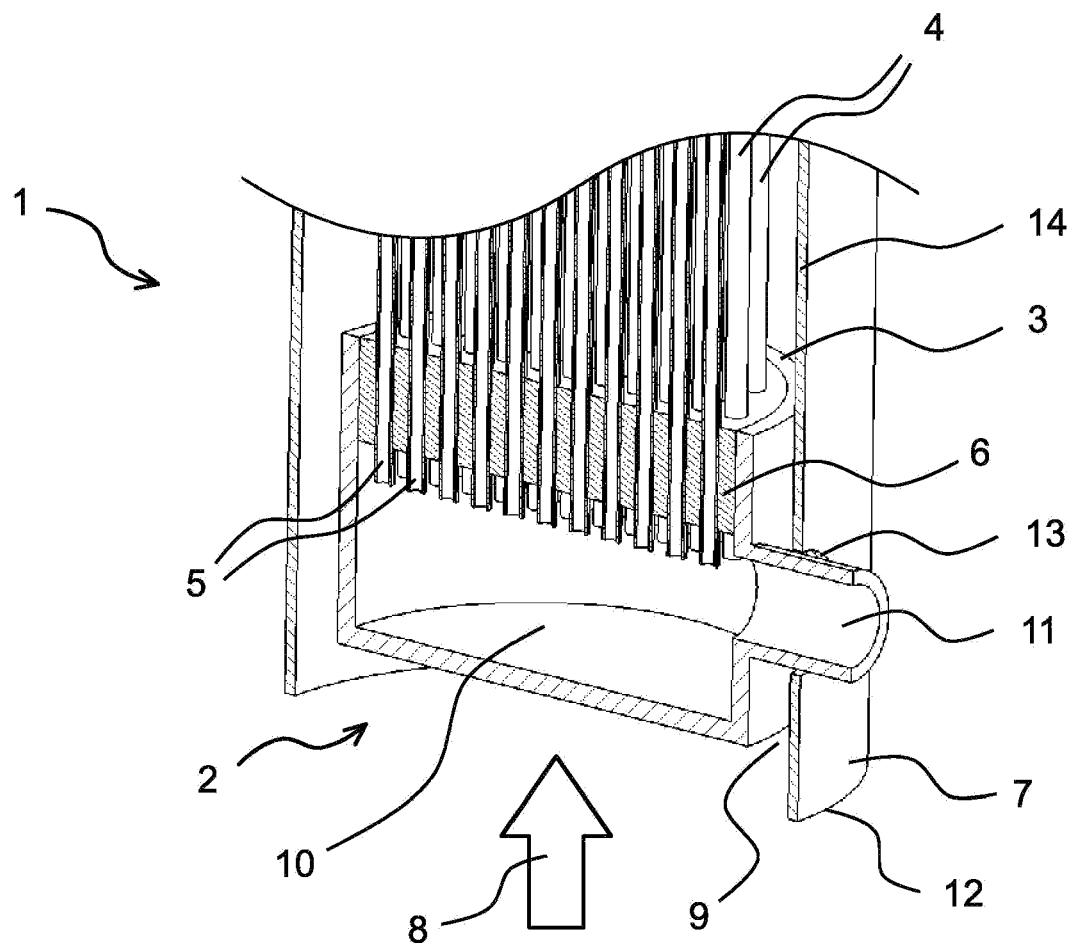
FIGS. 1A-C illustrate details and sectional views of a membrane filter according to the invention.

The drawing figures are not drawn to scale. All details of subsequently described membrane filters according to the invention are identical to embodiments of prior described membrane filters according to the invention.

FIG. 1A schematically illustrates a sectional view of the first membrane filter 1 for filtering a liquid.

The membrane filter 1 includes a base element 2 including exactly one membrane carrier 3, which is externally flowable by the liquid and a gas. The membrane carrier 3 has a circular cross section and a diameter of 75 mm. The base element 2 and the membrane carrier 3 are identical in this case.

Hollow fiber membranes 4 are attached at a top of the membrane carrier 3 and respectively include a lumen 5 into which a liquid permeate is filterable from the liquid. The hollow fiber membranes 4 are fabric reinforced and have an outer diameter 2 of 5 mm. A number of the illustrated hollow fiber membranes 4 does not correspond to the actual number of the hollow fiber membranes 4.

The hollow fiber membranes 4 are attached in the membrane carrier 3 by a resin layer 6 in which bottoms of the hollow fiber membranes 4 are encased in a sealing manner so that the lumen 5 of the hollow fiber membranes 4 remain open.

Furthermore, the membrane filter 1 includes a one-piece extruded pipe 7 that envelops the hollow fiber membranes 4 of the base element 2 and a gas inlet 8 configured to let the gas into a bottom of the membrane filter 1. The pipe 7 has an outer diameter of 100 mm. An annular gap 9 with a width of 10 mm is arranged between the membrane carrier 3 and the pipe 7. The annular gap 9 functions as an open flow cross section for a flow through of the liquid and the gas.

Additionally, the base element 2 includes a permeate collection cavity 10 that is connected with the lumen 5 of the hollow fiber membranes 4 to collect the permeate from the hollow fiber membranes 4 and a permeate outlet 11 for draining the permeate from the permeate collection cavity 10 laterally from the base element 2, this means essentially transversal to the hollow fiber membranes 4.

It is characteristic for the membrane filter 1 according to the invention that a lower edge 12 of the pipe 7 is arranged below the permeate outlet 11 in an assembled condition of the membrane filter 1 and the permeate outlet 11 runs laterally through an opening 13 in a wall 14 of the pipe 7.

Figure 1B:
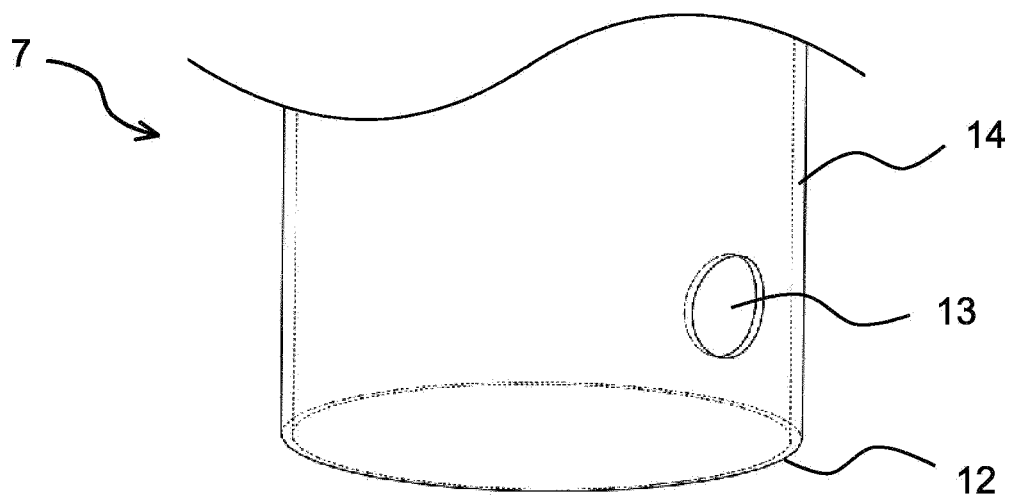

FIG. 1b shows the lower portion of the pipe 7 with the opening 13 and the lower edge 12 and the wall 14.

Figure 1C:
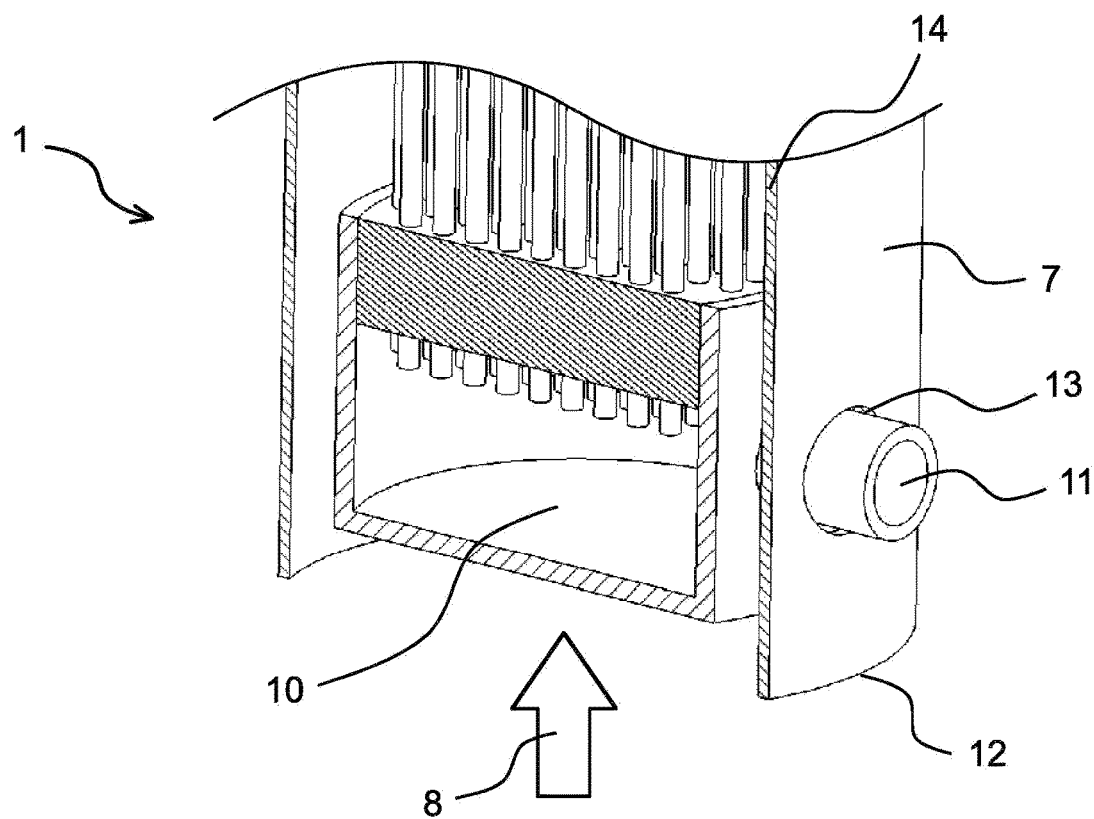

FIG. 1c illustrates another sectional view of the lower portion of the membrane filter 1. This shows that the permeate outlet 11 runs through the opening 13 in the wall 14 of the pipe 7, so that the lower edge 12 of the pipe 7 is arranged below the permeate outlet 11. Fixing the base element 2 in the pipe 7 is performed by a non-illustrated spacer between the pipe 7 and membrane carrier 3.

Figure 2:
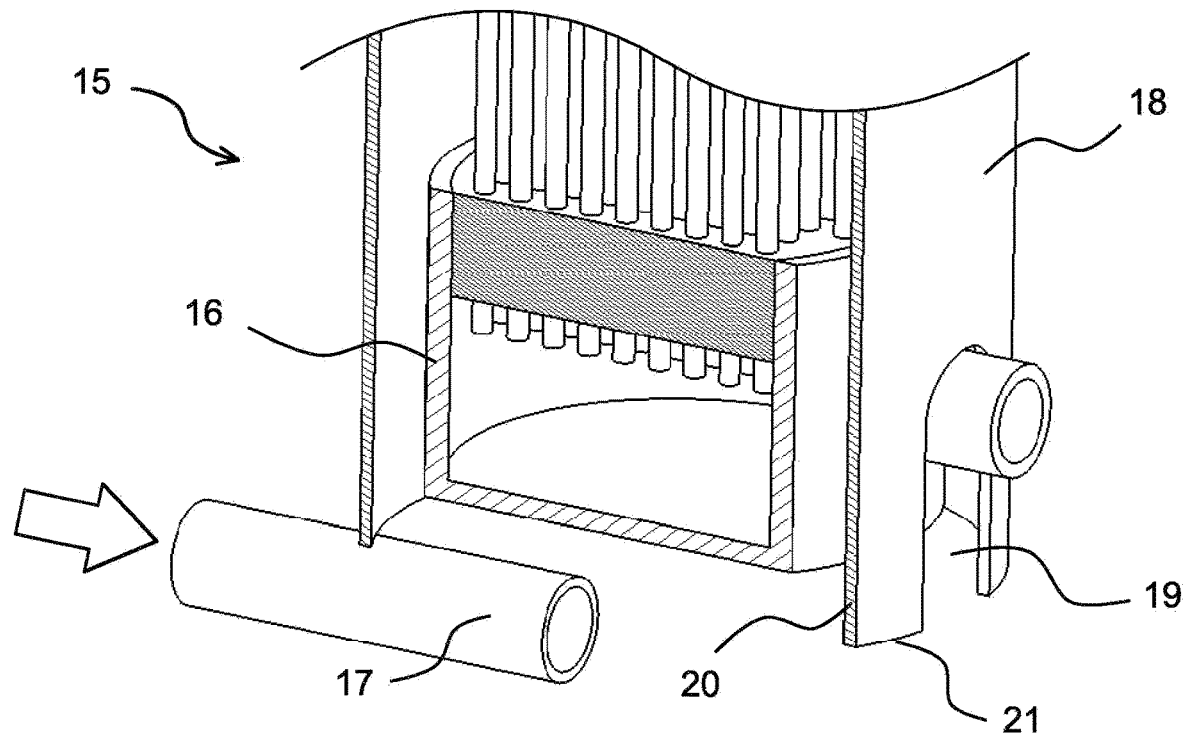
FIG. 2 illustrates a detail of a sectional view of a second membrane filter according to the invention.

FIG. 2 illustrates a sectional view of a lower portion of a second membrane filter 15 according to the invention. The base element 16 of this membrane filter 15 is identical to the base element 2 of the first membrane filter 1 according to the invention. In the second membrane filter 15, the gas inlet 17 is configured tubular and terminates centrally below the base element 16 and also below the pipe 18. Differently from the first membrane filter 1, the opening 19 of the second membrane filter 15 according to the invention extends in the wall 20 of the pipe 18 to lower edge 21 of the pipe 18. Thus, the pipe 18 can be slid from above onto the base element 16 of the membrane filter 15.

Figure 3A:
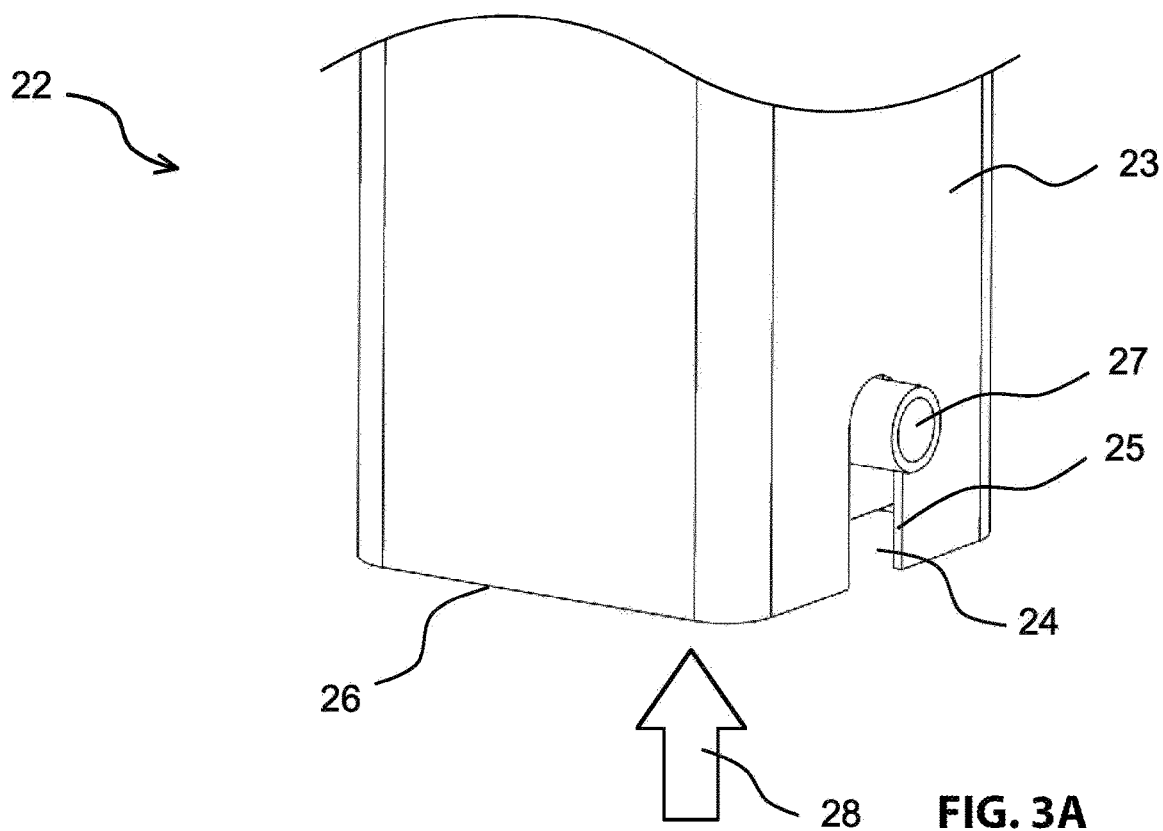
FIGS. 3 A-B illustrate a partial view of a third membrane filter according to the invention.

FIG. 3A shows a view of a lower portion of a third membrane filter 22 according to the invention. Differently from the first two membrane filters, the membrane filter 22 does not have a circular but a rectangular cross section. In this case also the pipe 23 is rectangular wherein the opening 24 in the wall 25 of the pipe 23 extends up to a lower edge 26 of the pipe 23 like in the second membrane filter 15 according to the invention. The permeate outlet 27 runs laterally through the opening 24. The gas inlet 28 runs from below into the pipe 23 and thus into the membrane filter 22

Figure 3B:
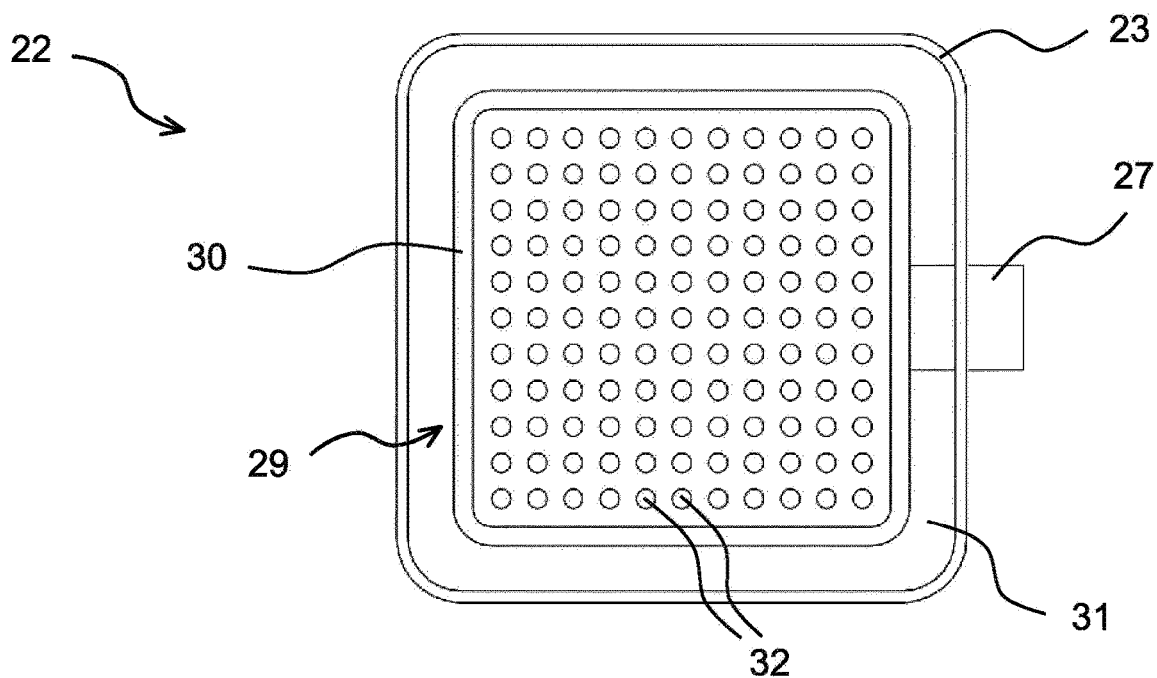

FIG. 3B illustrates a top view of the membrane filter 22. The base element 29 is also configured rectangular in this embodiment. Also, here the base element 29 includes exactly one membrane carrier 30. Both are also identical in this membrane filter 22. Between the membrane carrier 30 and the pipe 23 there is a rectangular annular gap 31 for a flow through of the liquid and the gas into the membrane filter 22. Hollow fiber membranes 32 are attached at the top in the membrane carrier 30, wherein the hollow fiber membranes 32 are individually closed on top and are connected with their respective open bottom sides of their lumen with a permeate collection cavity of the base element 29.

Figure 4A:
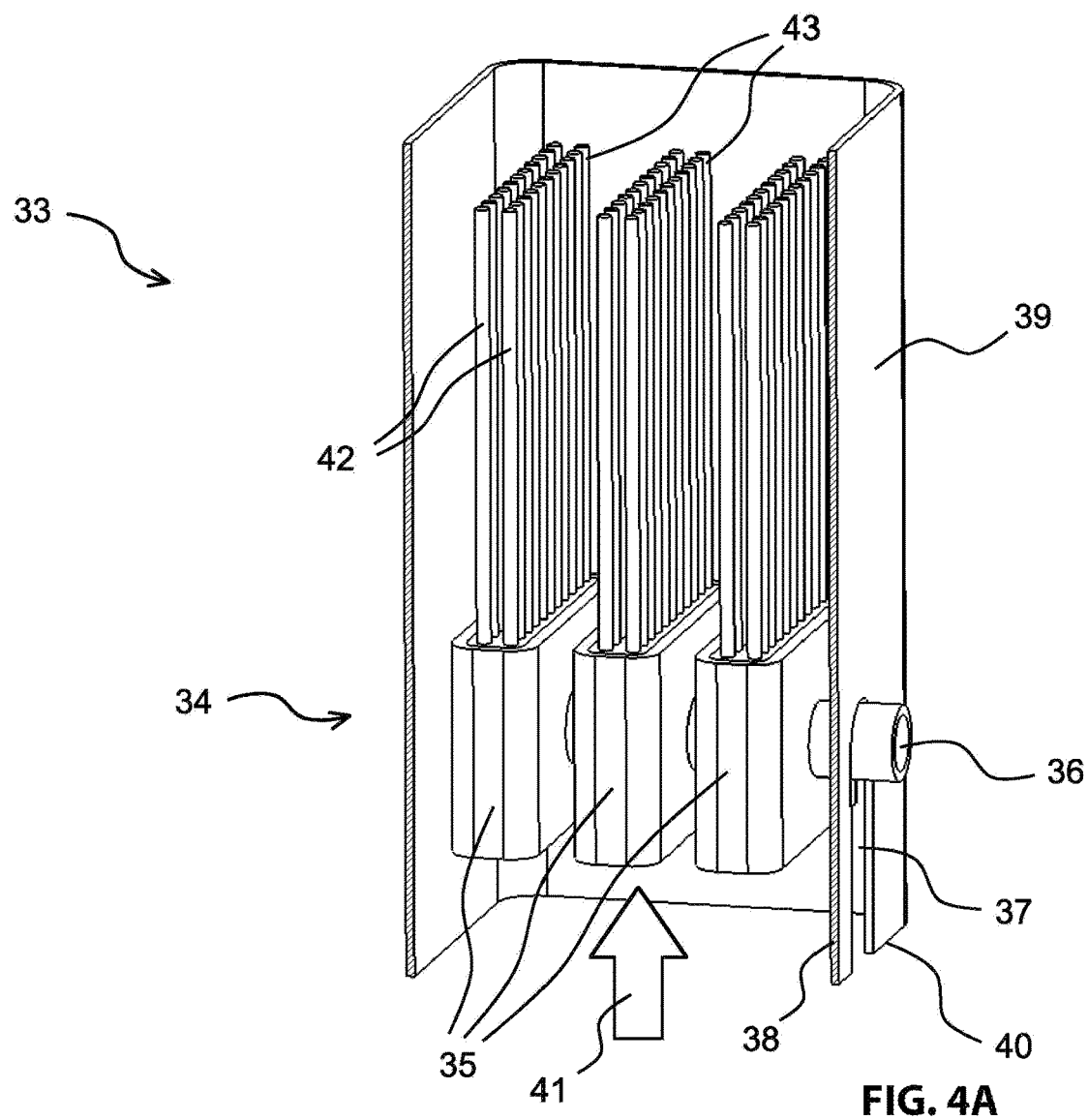
FIGS. 4A-B illustrate a sectional view and a view of a fourth membrane filter according to the invention.

FIG. 4A illustrates a sectional view of another embodiment of a membrane filter 33 that has a rectangular cross section. In this membrane filter 33, the base element 34 includes three identical membrane carriers 35 that include hollow fiber membranes 42 that lead into a joint permeate outlet 36. The permeate outlet 36 runs laterally through an opening 37 in a wall 38 of the rectangular pipe 39 of the membrane filter 33. The opening 37 leads to the lower edge 40 of the pipe 39 so that the pipe 39 is slidable from above onto the base element 34 of the membrane filter 33. The gas inlet 41 leads from below into the membrane filter 33.

Figure 4B:
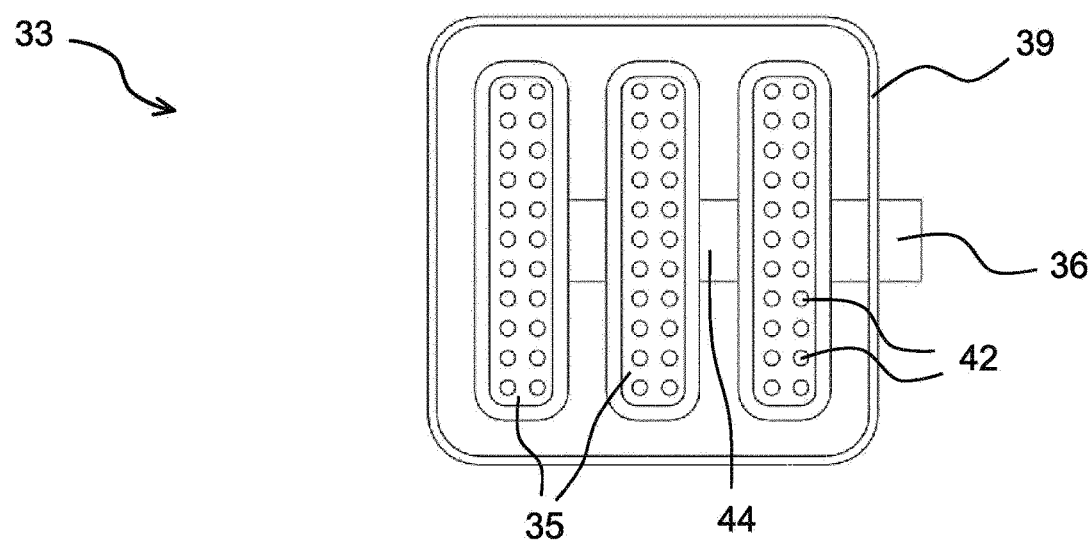

The hollow fiber membranes 42 are open at a bottom and fixed by resin and respectively individually closed at their upper ends 43. Thus, hair included in the liquid to be filtered and fibrous compounds can be carried out unimpeded in upward direction with the liquid and gas mix that flows through the membrane filter 33 from the bottom up. The pipe 39 extends beyond upper ends 33 of the membranes 42 by 5 cm FIG. 4B shows a top view of the membrane filter 33. It is evident that the membrane carriers 35 of the base element 34 are offset from one another so that the liquid and the gas can also flow between the membrane carriers 35 so that the membrane carriers 35 are completely enveloped by the flow. The membrane carriers 35 are connected with one another in the base element 34 by an anchor 44 that extends parallel to the permeate outlet 36.

Figure 5A:
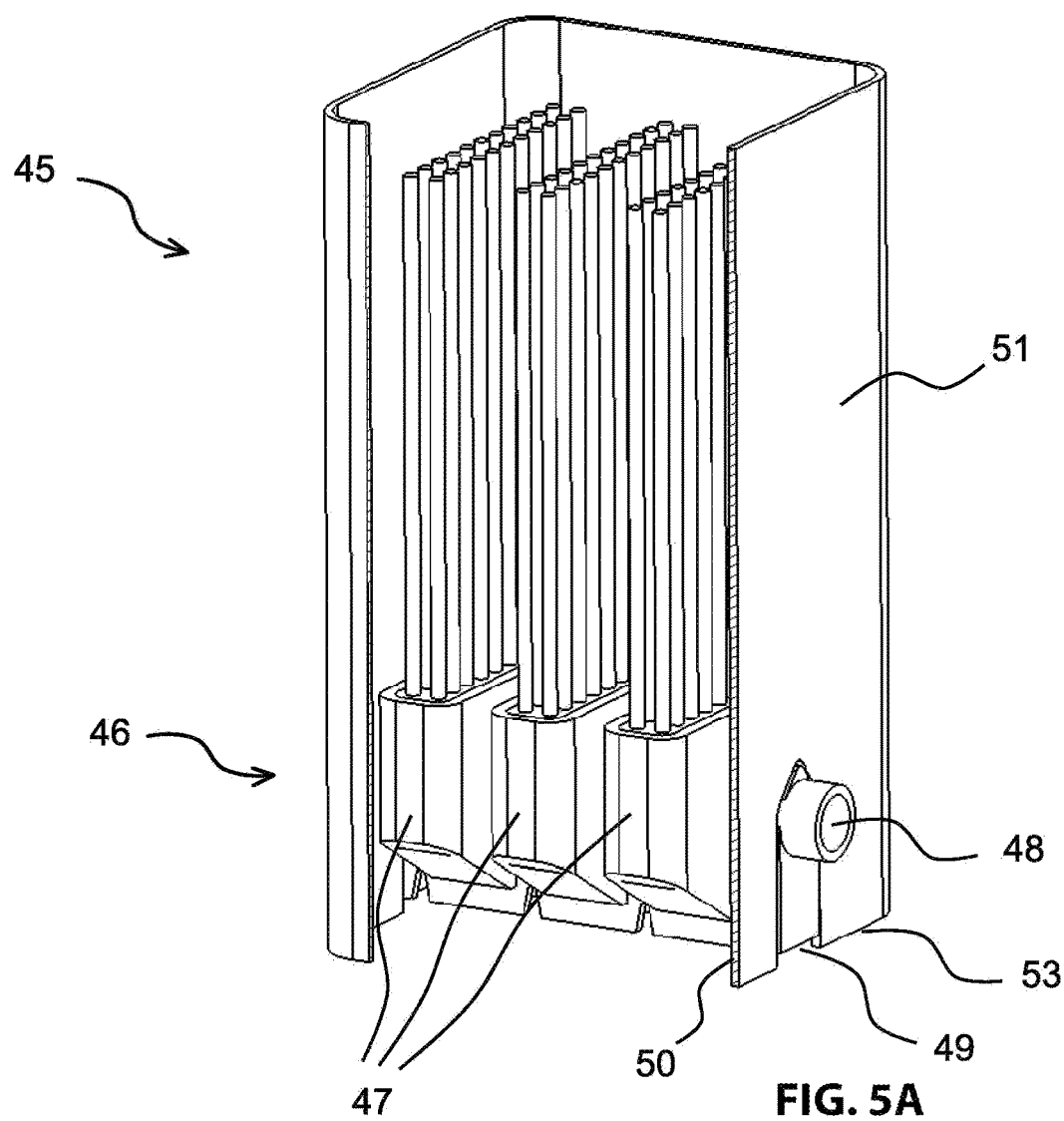
FIGS. 5A-D illustrate details of a fifth membrane filter according to the invention.

FIG. 5A illustrates a sectional view of a lower portion of another membrane filter 45 according to the invention. Like in the membrane filter 33 the base element 46 includes three identical membrane carriers 47 that are bevelled at a bottom at their flow impact side in order to facilitate a sliding of hair and fibrous compounds of the liquid to be filtered.

The permeate outlet 48 of the base element 46 is provided laterally through an opening 49 in the wall 50 of the rectangular pipe 51. Thus, a lower edge 53 of the pipe 51 is arranged below the permeate outlet 48.

Figure 5B:
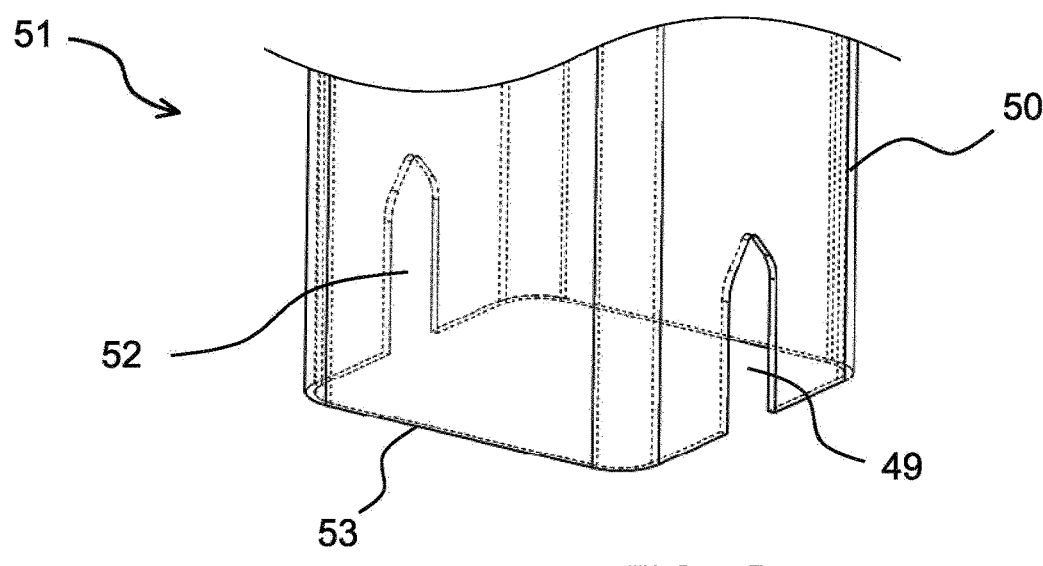

FIG. 5B shows a view of a lower portion of the pipe 51 of the membrane filter 45. The pipe 51 has a second opening 52 in addition to the opening 49, wherein the second opening is arranged in the wall 50 opposite to the opening 49. Both openings 49 and 52 extend to a lower edge 53 of the pipe 51, thus the pipe 51 is slidable from above onto the base element 46.

Figure 5C:
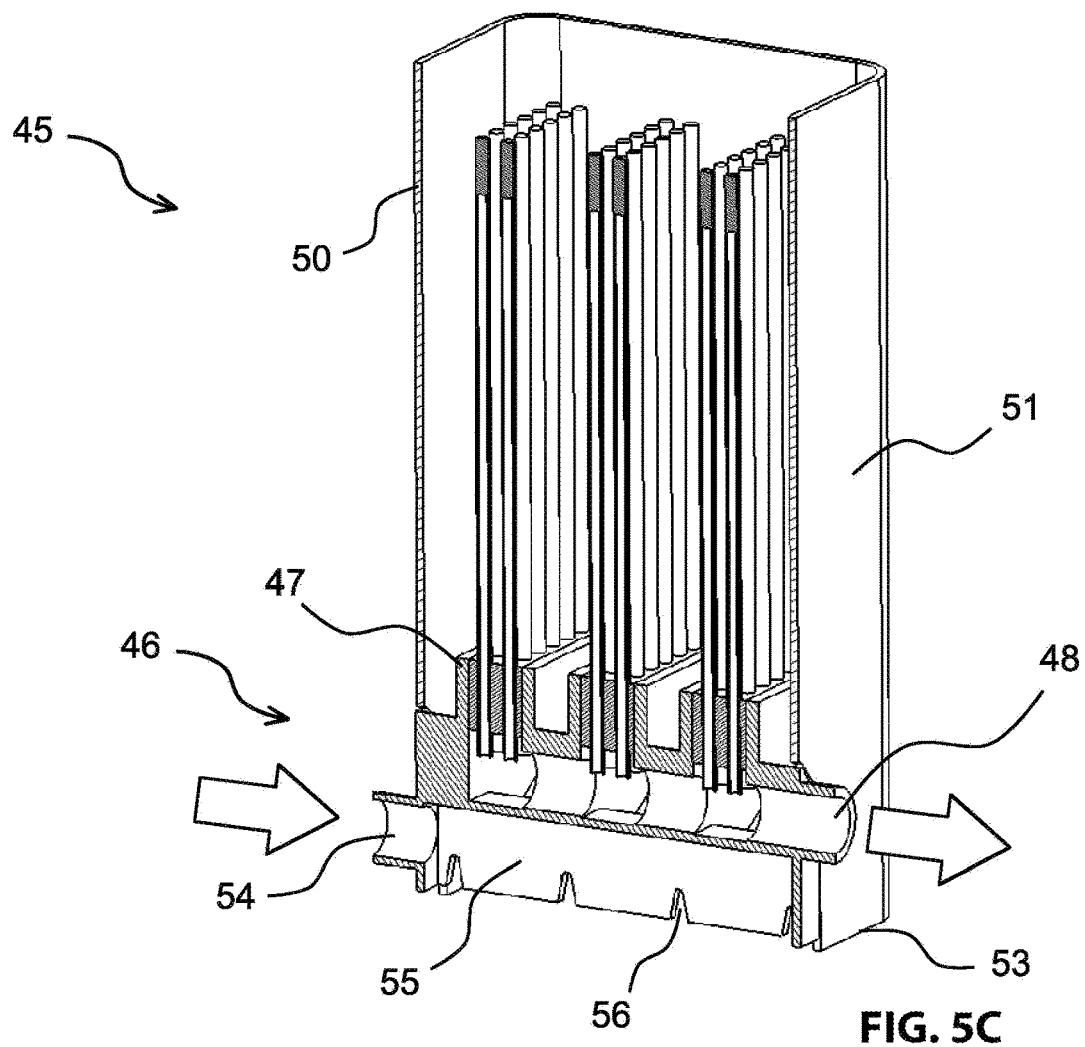

FIG. 5C illustrates a sectional view of the membrane filter 45 that the gas inlet 54 runs through the second opening of the rectangular pipe 51. The gas inlet 54 facilitates introducing gas laterally into a gas distribution system 55 of the base element 46 below the membrane carrier 47. The gas distribution system 55 is configured as a downward open tub that includes downward open slots 56 in the side walls configured to distribute the gas within the membrane filter 45.

Figure 5D:
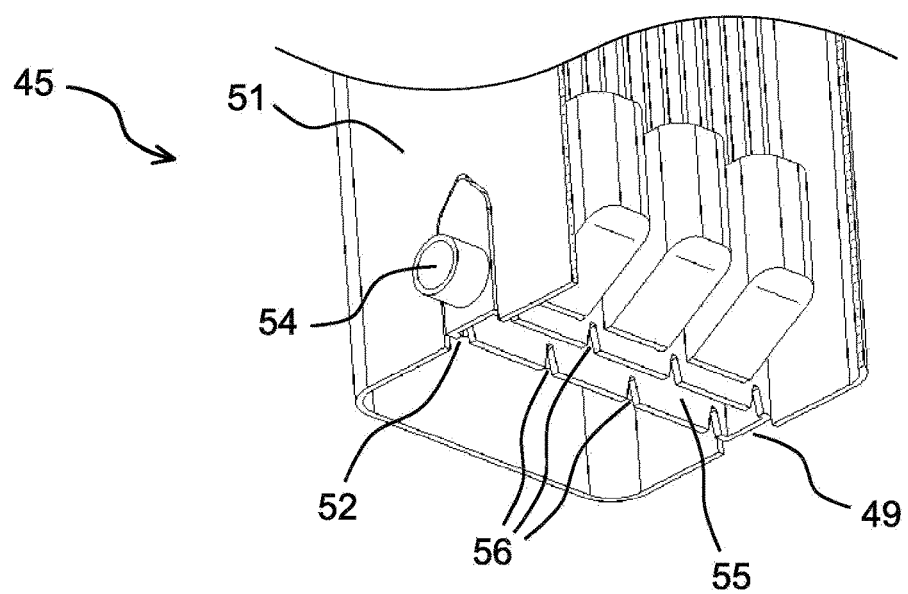

FIG. 5D illustrates a bottom view with a partial sectional view of the membrane filter 45. This also shows the gas inlet 54 that runs through the second opening 52 in the pipe 51 with the downward open gas distribution system 55 and the slots 56.

Figure 5E:
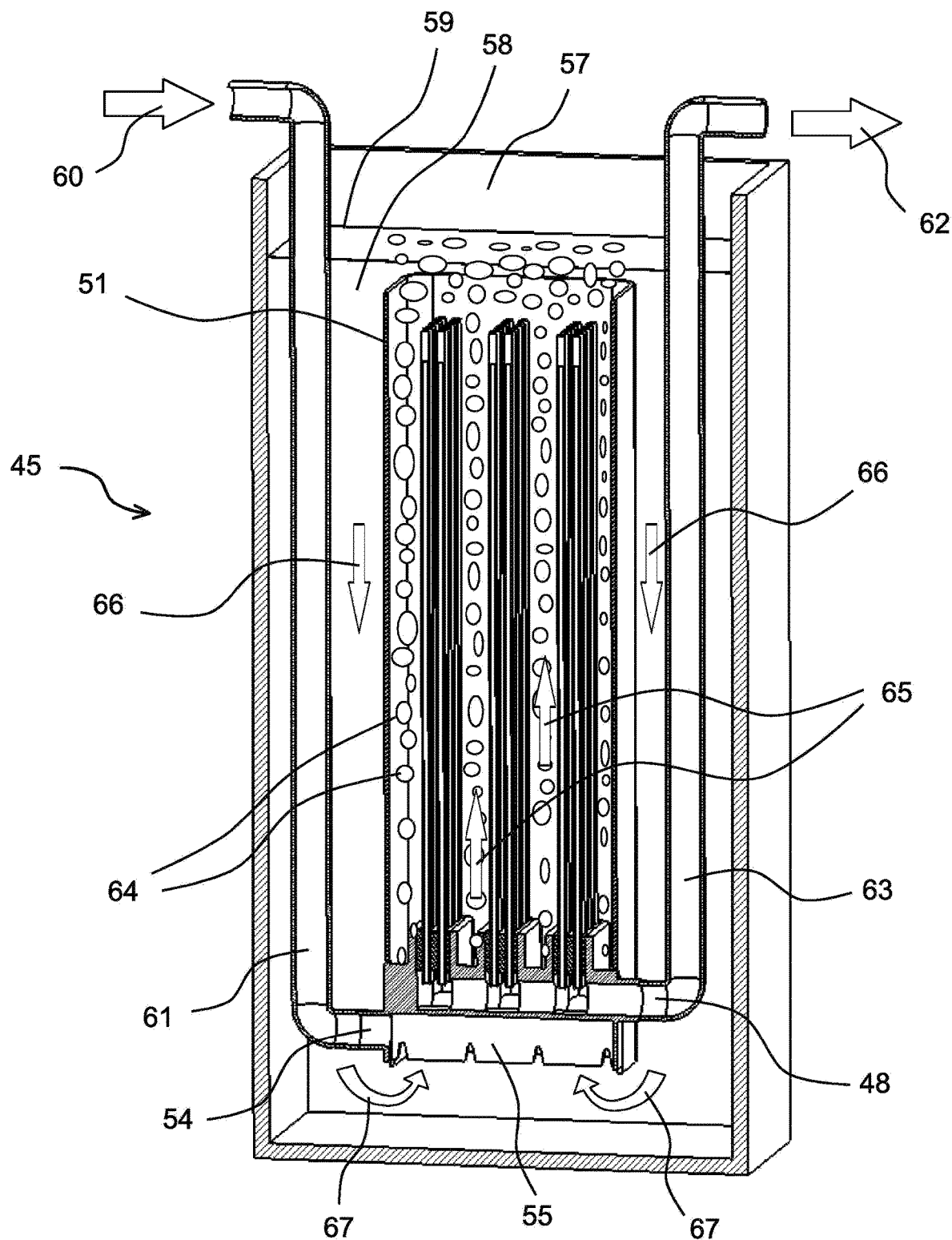
FIG. 5E illustrates submerged operations of the fifth membrane filter according to the invention in an exemplary manner that also applies to submerged operations of the other embodiments of the other membrane filters according to the invention.

FIG. 5E illustrates a sectional view of the membrane filter 45 in submerged operation in a biological waste treatment plant. Thus, the membrane filter 45 is submerged in a tub 57 with the liquid 58 that is to be filtered so that the membrane filter 45 is arranged completely below the liquid surface 59. The liquid to be filtered in this case is sludge of the waste treatment plant. The membrane filter 45 is supplied with gas for flushing the membranes using the introduced air 60. The introduced air 60 is blown through an air conduit from below into the membrane filter 45 wherein the air conduit is connected with the gas inlet 54 and distributed through the gas distribution system 55 in the membrane filter 45.

The permeate 62 produced during filtration is drained from the membrane filter 45 through a permeate conduit 63 that is connected to the permeate outlet 48. In the membrane filter 45 the introduced air 60 rises in a form of air bubbles 64 and thus causes an upward flow 65 of the mix including air and the liquid 58 to be filtered, this means the sludge. In a stationary condition there is a compensating downward flow 66 of the liquid to be filtered on an outside of the pipe 51 in the tub 57. Then a flow reversal 67 of the liquid 58 to be filtered occurs at the bottom side of the membrane filter 45 due to the suction effect of the mammoth pumping effect of the air bubbles 64 rising in the membrane filter 45.

Figure 6A:
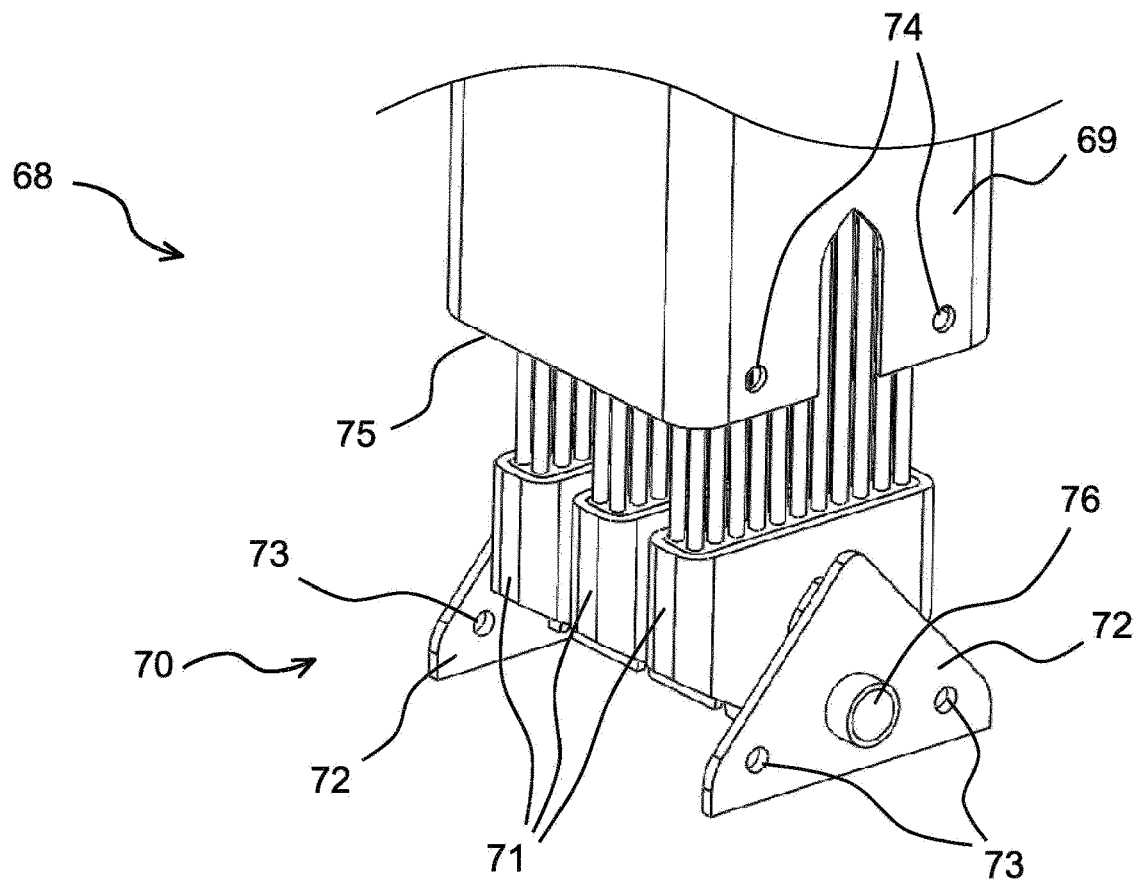
FIGS. 6A-D illustrate partial views showing assembly of a sixth membrane filter according to the invention.

FIG. 6A illustrates a view of a lower portion of another membrane filter 68 according to the invention during mounting of the pipe 69 on the base element 70. The base element 70 includes three identical membrane carriers 71 equipped with membranes and two side walls 72, respectively including two bore holes 73. The side walls 72 have a stabilizing and stiffening effect upon the membrane filter 68 at the joint between the pipe 69 and the base element 70. The wall of the pipe 69 includes bore holes 74 as well.

Like the in the membrane filter 45 described supra the pipe 69 has 2 openings that extend to a bottom edge 75 of the rectangular pipe 69. These openings are slid over the permeate outlet 76 and the air inlet from above when mounting the membrane filter 68 wherein the permeate outlet 76 and the air inlet are both part of the base element 70.

Figure 6B:
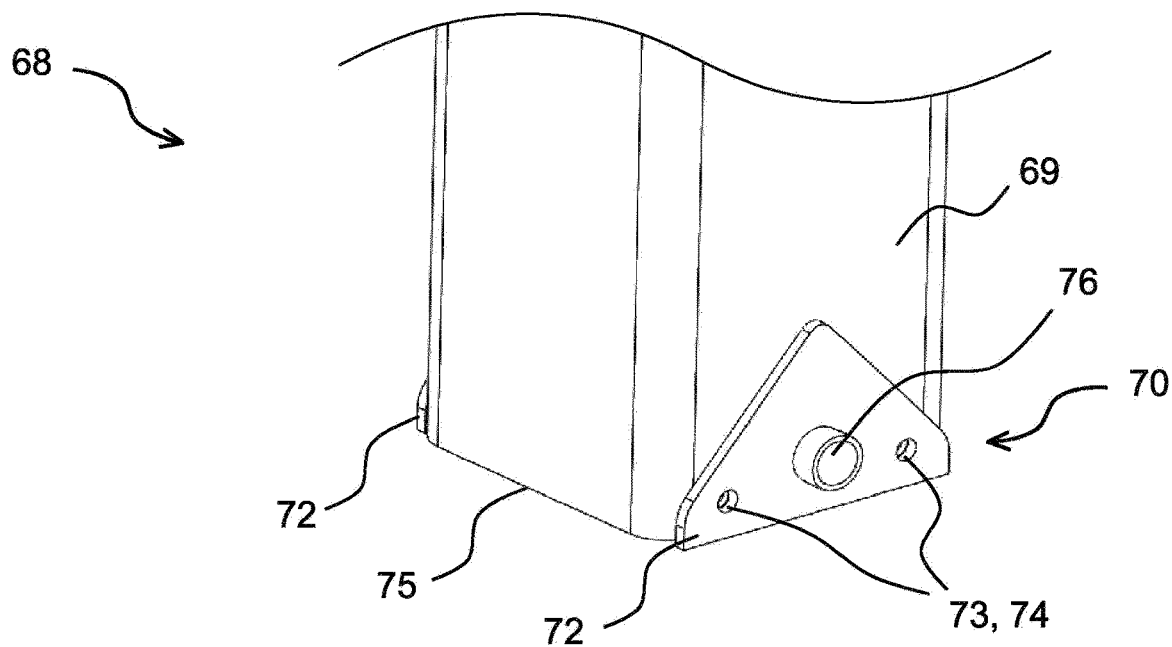

FIG. 6B shows that the bore holes 73 in the walls 72 of the base element 70 are aligned with the bore holes 74 of the pipe 69 when the pipe 69 is slid onto the base element 70.

Figure 6C:
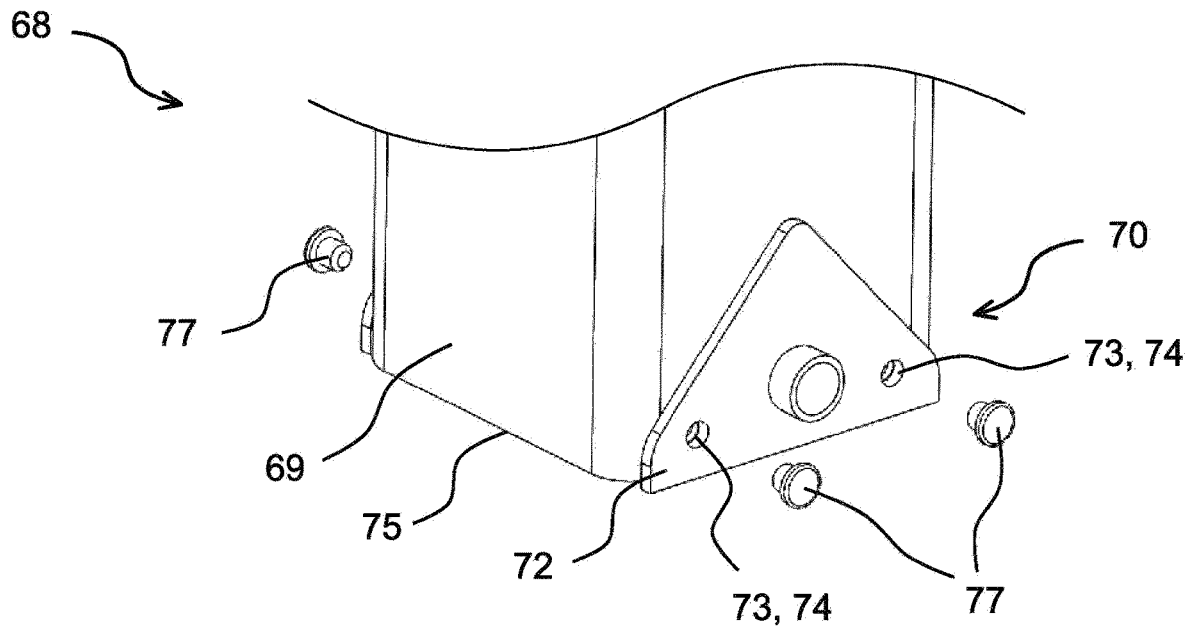

FIG. 6C shows that connection elements 77 are introduced into the aligned bore holes 73 and 74 of the base element 70 and of the pipe 69.

Figure 6D:
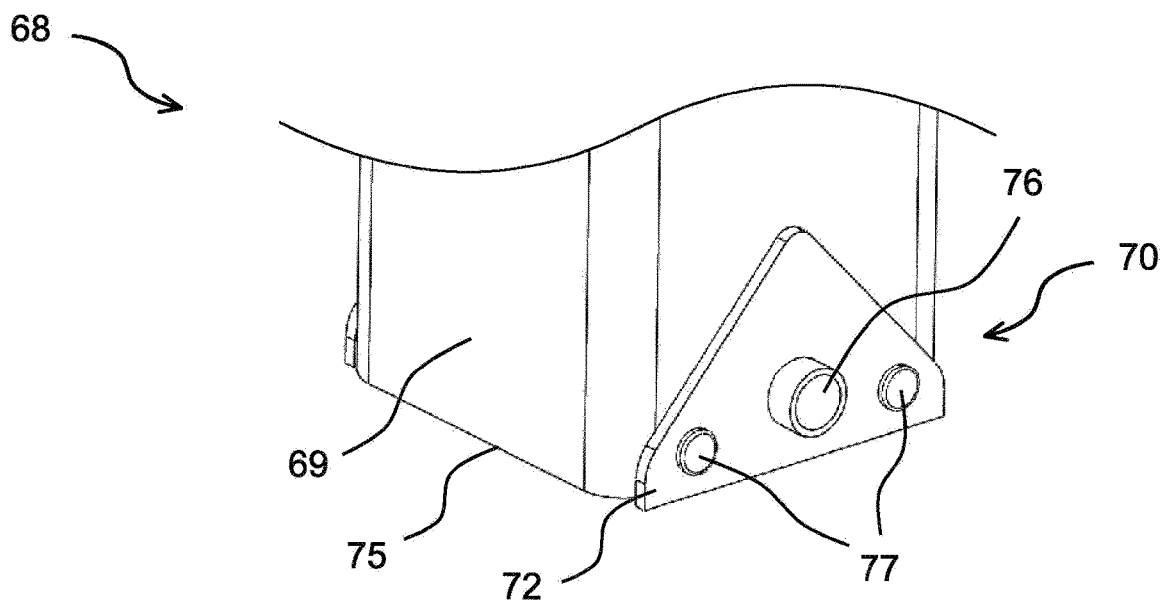

FIG. 6D illustrates an assembled condition of the membrane filter 68 according to the invention. Thus, the connection elements 77 penetrate the walls 72 of the base element 70 as well as the pipe 69. Also, when the membrane filter 68 is assembled a bottom edge 75 of the pipe 69 is arranged below the permeate outlet 76.

After removal of the connection element 77 the pipe 69 and the base element 70 are manually disengageable. Alternatively, the pipe 69 and the base element 70 can also be glued together.

Figure 7:
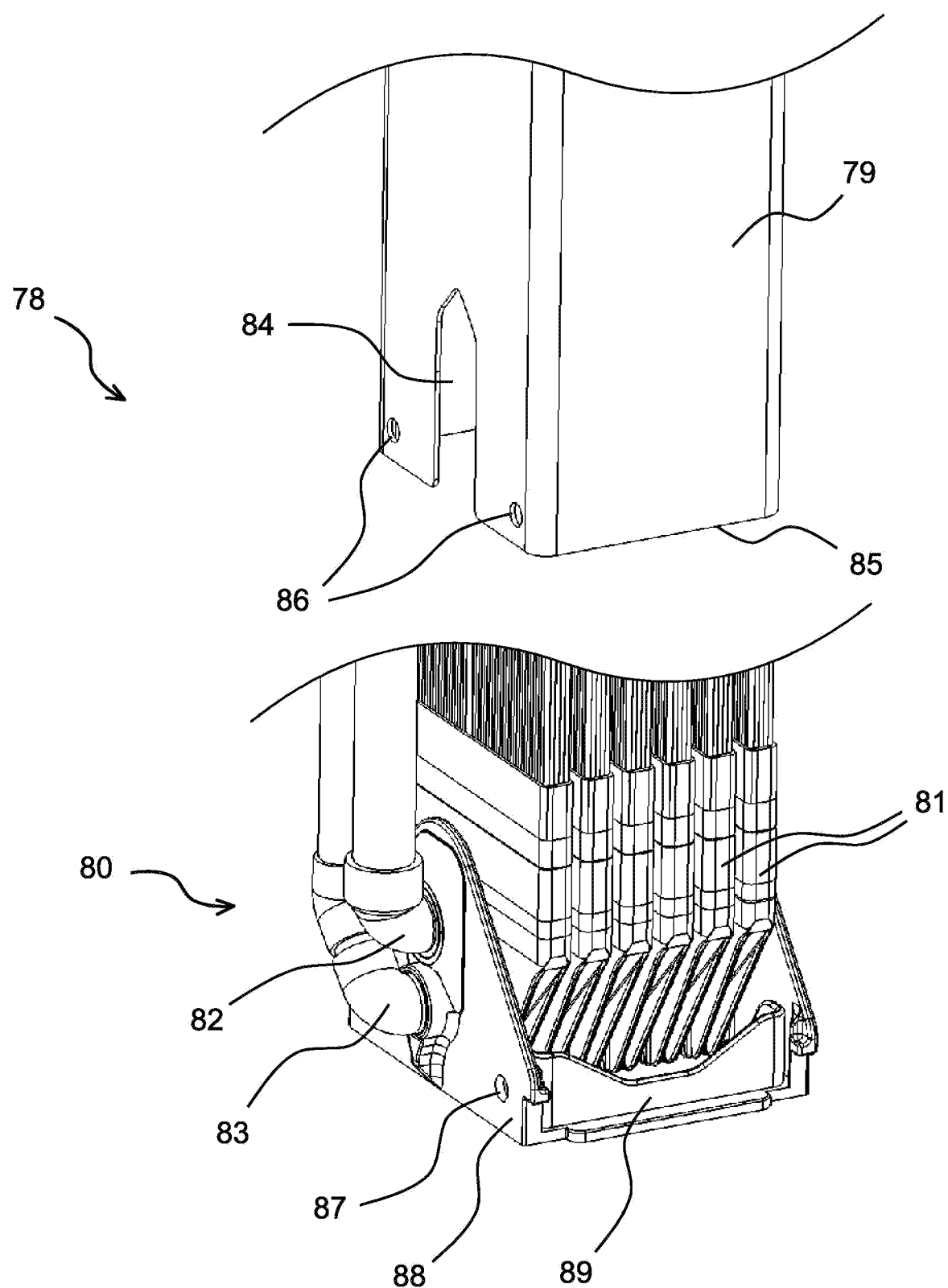
FIG. 7 illustrates partial views of a seventh membrane filter according to the invention during mounting of the pipe.

FIG. 7 shows another membrane filter 78 according to the invention with a rectangular pipe 79 and a base element 80 during assembly. The base element 80 includes six identical membrane carriers 81 that are equipped with membranes and a permeate outlet 82 and a gas inlet 83 that is arranged on an identical side of the base element. When the rectangular pipe 79 is slid onto the base element 80 the opening 84 of the rectangular pipe 79 is slid from above over the permeate outlet 82 and the gas inlet 83. Additionally, the pipe 79 includes an opposite second opening that extends also to the bottom edge of the rectangular pipe 79. The second opening is slid over a connection anchor of the membrane carriers 81 of the base element 80 and provides mechanical strength for the membrane filter 78. Additionally, the rectangular pipe 79 includes four bore holes 86 that are aligned with bore holes 87 in walls 88 of the base element 80 after the rectangular pipe 79 is slid onto the base element 80. For stability reasons the base element includes connection walls 89 between the walls 88 that mechanically support reception of the pipe 79 in the base element 80.

The connection of the base element 80 and the pipe 79 is provided by four non-illustrated connection elements that are inserted into the aligned bore holes 86 and 87.

REFERENCE NUMERALS AND DESIGNATIONS 1 membrane filter
2 base element 3 membrane carrier
4 hollow fiber membrane
5 lumen
6 resin layer
7 pipe
8 gas inlet
9 annular gap
10 permeate collection cavity
11 permeate outlet
12 bottom edge
13 opening
14 wall
15 membrane filter
16 base element
17 gas inlet
18 pipe
19 opening
20 wall
21 bottom edge
22 membrane filter
23 pipe
24 opening
25 wall
26 bottom edge
27 permeate outlet
28 gas inlet
29 base element
30 membrane carrier
31 annular gap
32 hollow fiber membrane
33 membrane filter
34 base element
35 membrane carrier
36 permeate outlet
37 opening
38 wall
39 pipe
40 bottom edge
41 gas inlet
42 hollow fiber membrane
43 upper end
44 anchor
45 membrane filter
46 base element
47 membrane carrier
48 permeate outlet
49 opening
50 wall
51 pipe
52 second opening
53 bottom edge
54 gas inlet
55 gas distribution system
56 slot
57 tub
58 liquid to be filtered
59 liquid level
60 air
61 air pipe
62 permeate
63 permeate pipe
64 air bubble
65 upward flow
66 downward flow
67 flow deflection
68 membrane filter
69 pipe
70 base element
71 membrane carrier
72 wall of base element
73 bore hole in wall of base element
74 bore hole in pipe
75 bottom edge
76 permeate outlet
77 connection element
78 membrane filter
79 pipe
80 base element
81 membrane carrier
82 permeate outlet
83 gas inlet
84 opening
85 bottom edge
86 bore hole in pipe
87 bore hole in wall of base element
88 wall of base element
89 connection wall

What is claimed is:

1. A membrane filter configured to filter a liquid, the membrane filter comprising:
a base element including at least one membrane carrier that is externally flowable by the liquid and a gas:
hollow fiber membranes respectively including lumen and attached at a top of the at least one membrane carrier wherein a liquid permeate is filterable from the liquid into the lumen;
a one piece extruded circumferentially closed longitudinally smooth pipe that envelops the hollow fiber membranes;
a gas inlet configured to let gas into a bottom of the membrane filter;
at least one permeate collection cavity included in the base element and connected with the lumen and configured to collect the liquid permeate from the hollow fiber membranes;
a permeate outlet tube included in the base element and configured to drain the liquid permeate from the at least one permeate collection cavity laterally from the base element,
wherein the base element is axially inserted into an interior of the longitudinally smooth pipe
wherein an external radial dimension of the base element is smaller than an internal radial dimension of the longitudinally smooth pipe,
wherein the permeate outlet tube is inserted into an opening in a wall of the longitudinally smooth pipe so that a bottom edge of the longitudinally smooth pipe is arranged below the base element and below the permeate outlet tube and the permeate outlet tube runs laterally through the opening in the wall of the longitudinally smooth pipe,
wherein an annular gap between the at least one membrane carrier and the longitudinally smooth pipe is configured as a flow cross section for an upward flow of the liquid and the gas,
wherein the base element and the longitudinally smooth pipe are connected with each other, and
wherein the gas flows axially upward in the longitudinally smooth pipe through an entire inner cross section of the longitudinally smooth pipe into the flow cross section that is formed by the annular gap between the at least one membrane carrier and the longitudinally smooth pipe.

2. The membrane filter according to claim 1, wherein the opening extends to the bottom edge of the longitudinally smooth pipe.

3. The membrane filter according to claim 1, wherein the longitudinally smooth pipe has a rectangular cross section.

4. The membrane filter according to claim 1,
wherein the at least one membrane carrier includes plural membrane carriers that respectively include the hollow fiber membranes, and
wherein the membrane carriers are externally flowable by the liquid.

5. The membrane filter according to claim 1, wherein the gas inlet runs laterally through the opening of the pipe.

6. The membrane filter according to claim 1, wherein the gas inlet runs laterally through a second opening in the wall of the pipe.

7. The membrane filter according to claim 1, wherein the base element and the pipe are connected with one another by connectors.

8. The membrane filter according to claim 7, wherein the connection elements respectively penetrate the pipe and at least one wall of the base element.

9. The membrane filter according to claim 7, wherein the longitudinally smooth pipe and the base element are manually disengageable after removal of the connectors.

10. The membrane filter according to claim 1, wherein the longitudinally smooth pipe and the base element are glued together.

\* \* \* \* \*